May 18, 1965     G. J. L. SEIBEL     3,184,342
GAS-TIGHT CASINGS FOR POWER SOURCES OR OTHER
TYPES OF ELECTROCHEMICAL CELLS
Filed Nov. 20, 1961

INVENTOR
GUY JEAN LOUIS SEIBEL
BY
ATTORNEYS

United States Patent Office 3,184,342
Patented May 18, 1965

3,184,342
GAS-TIGHT CASINGS FOR POWER SOURCES OR OTHER TYPES OF ELECTROCHEMICAL CELLS
Guy Jean Louis Seibel, La Celle St. Cloud, France, assignor to Societe des Accumulateurs Fixes et de Traction (Societe Anonyme), Romainville, Seine, France, a company of France
Filed Nov. 20, 1961, Ser. No. 153,522
Claims priority, application France, Dec. 2, 1960, 845,759
16 Claims. (Cl. 136—166)

This invention relates to gas-tight casings for electrochemical power sources such as primary or secondary cells or other types of electrochemical cells.

Gas-tight casings for primary or secondary cells made of two cups which are united by a compressed elastic bushing or gasket are already known. The two cups are thus insulated from each other, so that it is possible to put in each of these cups the active material of suitable polarity, the bottom of each cup being then used as current collector, or terminal. The main advantage of this way of constructing the cells is the possibility of obtaining a series-connection of several cells by merely piling them up. This kind of cell is sometimes called a "button-cell." The effective sealing of these casings, however, presents a problem.

Numerous solutions have been suggested for this problem, one of the first in point of time being the button type gas-tight cells described in the British Patent No. 561,820, filed on January 30, 1943.

All these various known devices, however, have some drawbacks inherent to their principle in itself. The main drawback is constituted by the fact that an elastic bushing or gasket never stays rigorously gas-tight. This gasket is subject to ageing, to flow, and to the unequal distribution of the pressure, especially if this pressure is derived from the elastic forces of the material constituting the cups.

There are other drawbacks, such as, for instance, the practically absolute necessity of giving a circular or cylindrical shape to the cups. Thus, circular shaped cells are obtained, and by piling them up, cylindrical shapes. But the cylindrical shape has a very low coefficient of utilization of the available space, the unused space amounting to:

$$100 \cdot \frac{4-\pi}{4} = 22\%$$

The idea of the degree of tightness needed is now being modified due to several factors:

It is necessary to have practically perfect tightness to avoid leaking away of the constituents of a cell. This is, for instance, the case for the storage of primary cells that are ready for use. A slow evaporation of the electrolyte, even if it is negligible by itself, will result, after a sufficient length of time, in more or less desiccation of the cell. This desiccation is undesirable.

It is very important in some kinds of gas-tight secondary cells always to find the same electrochemical, mechanical and thermodynamical states, reproduced during the various cycles of its operation, i.e., during the life of the cell, so that it will be possible to maintain this cell is the best conditions during use for resorbing, absorbing or eliminating the electrolysis products. Any loss by leakage of one of the gases from such a cell in relation with the other, such as hydrogen in relation with oxygen, results in a change in the state of charge of the electrodes which may be obnoxious to the operation of the gas-tight cell.

In aeronautical applications, the electrochemical power sources have to operate in a more or less complete vacuum depending on the altitude at which the vehicle which carries power source is to move. A sealing tightness which seems acceptable in usual circumstances may no longer be satisfactory under these special conditions.

Power sources have to be absolutely tight in order to be used safely with electronic devices with which no leakage may be tolerated.

A principal object of the present invention is a new way of constructing a casing for power sources or other electrochemical cells, which has a perfect hermetic tightness and which may be produced in any kind of shape: square, rectangular, oval, circular, or the like and which allows series-connection of the power sources by merely piling them up.

An essential feature of the invention is found in the fact that one of the two cups or parts of the casing, is first manufactured, being made of two pieces which if they are metallic, are linked together by a rigorously tight hermetic insulating weld. One of these pieces may be constituted by a flat bottom and the other may have a tubular cylindrical or prismatic shape. The second cup, or casing part made of a suitable conductive metallic material, which may be taken as a cover, for instance, is welded to the cylindrical or prismatic piece of the first cup, after the constituents of the electrochemical power source have been positioned, such constituents being, if necessary, electrically insulated from the tubular piece, by any suitable means.

This feature of the invention can be realized in various embodiments in order to take several possibilities into account. Thus, it may be useful, in some cases, to make the tubular piece of the first cup of plastic material, this piece being then obtained by molding.

The following description in relation to the annexed drawings, given as a non-limitative example, will help understanding the various features of the invention and the way to realize them, any characteristics which may be found either in the specification or in the drawing being, of course, part of the present invention.

Figure 1:
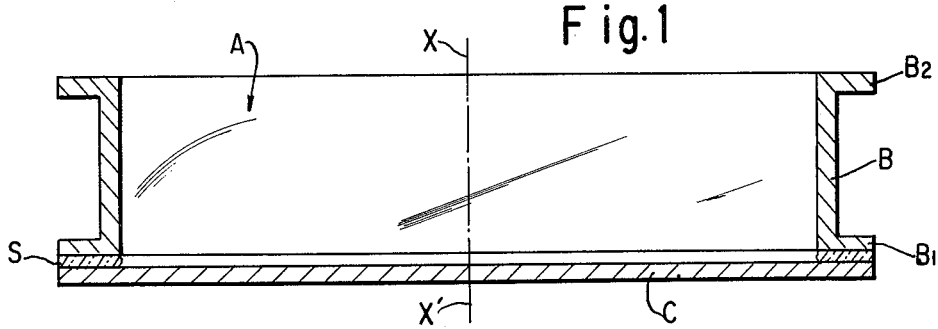
FIGURE 1 is an axial section of the lower cup of a casing of a power source prepared according to the invention.
Figure 2:
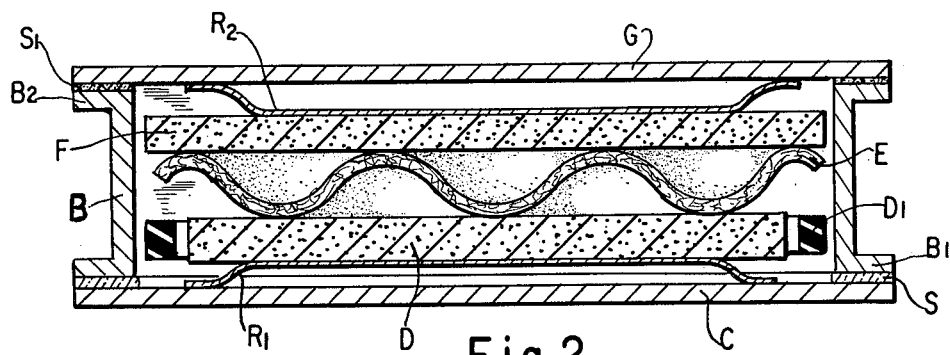
FIGURE 2 is also an axial section of a power source made with the cup of FIGURE 1.
Figure 3:
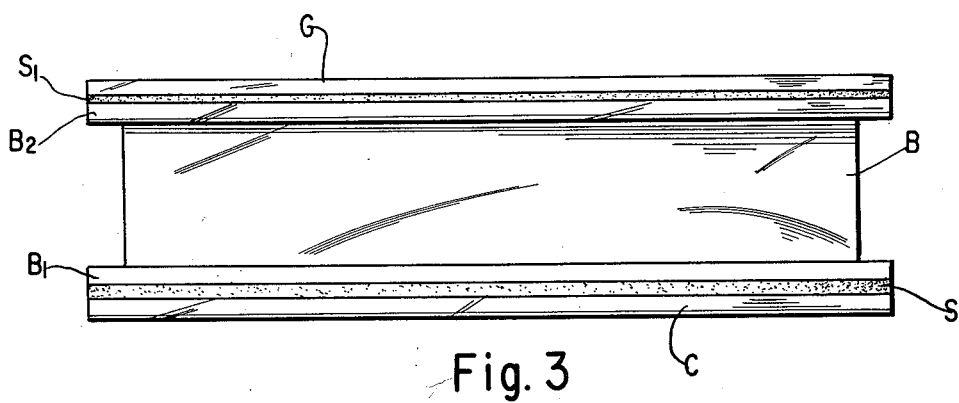
FIGURE 3 is an elevation view of the same power source.

FIGURE 1 shows a cup A made of two metal pieces; a cylindrical or prismatic tube B comprising two annular or peripheral flanges $B_1$ and $B_2$ at its two opposite ends and a bottom C, which is a metallic blank or disc cut to have the peripheral dimensions defined by the shape and dimensions of the flange $B_1$. The horizontal section of this cup A is of any shape, e.g., circular or rectangular; the cup may be made symmetrical about an axis X–X', as depicted in FIGURE 1, but it may also be otherwise.

The metal pieces B and C are fastened together by a tight, hermetic insulating weld S between the flange $B_1$ and bottom C. This weld S may be obtained by various means already known by themselves, e.g., the two pieces B and C may be welded through the means of a sintered glass joint or weld S. This joint S is particularly effective and advantageous for several reasons. On the one hand, it is possible by suitably selecting the grade of the glass constituting the weld S of the joint relatively to that of the metal constituting the pieces B and C, or vice versa, to obtain the same coefficient of expansion for both materials; as an example, the metallic pieces B and C can be made of an iron-nickel alloy of a suitable composition so that it has the same coefficient of expansion as the glass used. On the other hand, the glass is selected in such a grade that it is practically unaltered by the electrolyte which is to be used in the power source to be made with cup A.

Instead of using a weld S obtained by a sintered glass joint, it is also possible to weld the two metal pieces B and C through the means of a layer of highly polymerized plastic material which adheres to the metal, such as a viscous solution of a resin of the epoxy type which is sold under the trade-name of Araldite. It is then advantageous to prepare the two surfaces which are to be adhered together by a previous sand-blasting operation to roughen them so that the metal-plastic material weld is more tenacious.

Whatever mode of welding is chosen, it is evident that the principal advantage of the process herein described is that this tight, hermetic insulating weld S is made on cup A before it has received any electrochemical material, so that the said weld may be effected under the best conditions for insuring its hermetic tightness. It is thus possible to apply the desired pressure and temperature in effecting the weld during the required time of treatment.

When this cup A has been produced, the various constituents of the electrochemical power source, together with or impregnated with the suitable amount of electrolyte are assembled with said cup. As an example, a metal spring $R_1$ may first be positioned in the cup resting on bottom C. Then an electrode D, which is electrically connected to the metal bottom C either directly or through the spring $R_1$ is inserted, the said electrode D being insulated from the cylindrical or prismatic tube B, e.g., through the means of an insulating ring $D_1$. A conventional separator E is then positioned on electrode D, this separator being an insulating part intended for maintaining the suitable distance between the electrodes D and F. This separator E, which is diagrammatically shown on the drawing as a corrugated piece, may be constituted, as in already known power sources of the button type, by a ring or a disc made of a porous material, the thickness and nature of which is such that it maintains between the electrodes the required suitable amount of electrolyte. The electrode F is then inserted over separator E. Then, a metal spring $R_2$ is put over electrode F. Finally, a metal cover G which is identical to piece C is positioned over spring $R_2$ to rest on flange $B_2$ of tube B. The electrode F is in electrical contact with the cover G either directly or through the spring $R_2$, and may without disadvantage be in electrical contact with the cylindrical or prismatic tube B. Electrolyte is put into the assembly in the same form as in the already known button-type cells.

When these constituents have been put in place, the cell is sealed by welding the cover G to the flange $B_2$ of the cylindrical or prismatic tube B at $S_1$. This weld $S_1$, metal to metal, does not present any insuperable difficulties. It may be effected either by hot welding or by cold welding, e.g., by pressure. When hot welding is used, it is only necessary to take care that the time of welding is very short in order to avoid heating the constituents of the electrochemical power source that have been inserted in casing A. This weld $S_1$ must, of course, provide an hermetic seal that is gas and fluid tight.

Instead of only one group of electrodes D and F, the power source may comprise several electrodes of each polarity.

It is well understood that the preferred embodiments of the invention which have been described are not limitative and this invention may comprise many other embodiments. It is possible, for instance, to make the cylindrical or prismatic piece or tube B of plastic material, the bottom C and cover G being, of course, metallic. Their welding and hermetic sealing to the piece B may be effected by use of a polymerizable plastic material of the epoxy type, e.g., Araldite which adheres both to the plastic material of piece B and to the metal of bottom C and of cover G.

It is also possible to prepare a gas-tight casing by the means of two metal cups obtained by stamping, united and welded by an adhesive layer of an epoxy type resin, such as the resin which is sold under the trade-name of Araldite. The cups may then advantageously be provided with flanges, the surface of each of which will be previously treated so that it is rough, so as to insure a tenacious grip between the welded components.

Other variations within the scope of the appended claims are possible and are contemplated.

What is claimed is:

1. A sealed, gas-tight casing for an electrochemical power source containing electrodes comprising two conductive wall piece together defining a cup-like part and one of which is in electrical connection with an electrode, an insulating sealing weld of glass joining the two conductive pieces, and a conductive cover piece in electrical connection with another electrode united with the cup-like part with an electrically conductive sealing weld.

2. A sealed, gas-tight casing for an electrochemical power source containing electrodes, comprising two conductive metallic wall pieces together defining a cup-like part and one of which is in electrical connection with an electrode, an insulating sealing weld of glass joining the two conductive pieces, said two conductive pieces having the same coefficient of expansion as the glass of the weld, and a conductive metallic cover piece in electrical connection with another electrode and united with the cup-like part with a metal-to-metal sealing weld.

3. A sealed, gas-tight casing for an electrochemical power source containing electrodes comprising two conductive metallic wall pieces together defining a cup-like part and one of which is in electrical connection with an electrode, an insulating sealing weld of highly polymerizable resin of the epoxy type joining the two conductive pieces, and a conductive metallic cover piece in electrical connection with another electrode and united with the cup-like part with a metal-to-metal sealing weld.

4. A sealed, gas-tight casing for an electrochemical power source containing electrodes comprising a tubular metallic part having a peripheral flange at each end thereof, a metallic bottom part in electrical contact with an electrode, a metallic cover part in electrical contact with another electrode, an insulating sealing weld joining the bottom part to the flange at one end of said tubular part and another sealing weld joining the cover part to the flange at the other end of said tubular part.

5. A sealed, gas-tight casing for an electrochemical power source containing electrodes comprising a tubular metallic part having a peripheral flange at each end thereof, a conductive bottom part in electrical contact with an electrode, a conductive cover part in electrical contact with another electrode, an insulating sealing weld of glass joining the bottom part to the flange at one end of said tubular part and another sealing weld joining the cover part to the flange at the other end of said tubular part.

6. A sealed, gas-tight casing for an electrochemical power source comprising a tubular metallic part having a peripheral flange at each end thereof, a conductive metallic bottom part in electrical contact with an electrode, a conductive cover part in electrical contact with another electrode, an insulating sealing weld of glass joining the bottom part to the flange at one end of said tubular part, said bottom part and said tubular part being of iron-nickel alloy having the same coefficient of expansion as the glass of the sealing weld, and another sealing weld joining the cover part to the flange at the other end of said tubular part.

7. A sealed, gas-tight casing for an electrochemical power source containing electrodes comprising a tubular metallic part having a peripheral flange at each end thereof, a conductive metallic bottom part in electrical contact with an electrode, a conductive metallic cover part in electrical contact with another electrode, an insulating sealing weld of glass joining the bottom part to the flange at one end of said tubular part, said bottom part and said tubular part having the same coefficient of expansion as the glass of the sealing weld, and another sealing weld joining the cover part to the flange at the other end of said tubular part.

8. A sealed, gas-tight casing for an electrochemical power source containing electrodes comprising a tubular metallic part having a peripheral flange at each end thereof, a conductive bottom part in electrical connection with an electrode, a conductive cover part in electrical connection with another electrode, an epoxy-type resin insulating seal joining the bottom part to the flange at one end of said tubular part and another sealing weld joining the cover part to the flange at the other end of said tubular part.

9. A method of manufacturing a sealed, gas-tight casing for an electrochemical power source comprising the steps of assembling a conductive wall piece with another piece to define a cup-like part, uniting the two pieces with a rigorous fluid-tight insulating weld, thereafter inserting the electrochemical constituents of the power source into the cup-like part, then applying a cover to the cup-like part and uniting it therewith by an electrically conductive sealing weld.

10. A method of manufacturing a sealed, gas-tight casing for an electrochemical power source comprising the steps of assembling a tubular piece with a conductive bottom piece to define a cup-like part, uniting the bottom piece with the tubular piece by an insulating and sealing weld, thereafter inserting the electrochemical constituents of the power source into the cup-like part, then applying a metallic cover piece to the cup-like part and uniting the cover piece with the cup-like part by an electrically conductive sealing weld.

11. A method of manufacturing a sealed, gas-tight casing for an electrochemical power source comprising the steps of assembling a tubular metallic piece with a conductive bottom piece to define a cup-like part, uniting the bottom piece with the tubular piece by an insulating and sealing weld of glass, thereafter inserting the electrochemical constituents of the power source into the cup-like part, then applying a metallic cover piece to the cup-like part and uniting the cover piece with the cup-like part by a metal-to-metal weld.

12. A method of manufacturing a sealed, gas-tight casing for an electrochemical power source comprising the steps of assembling a tubular metallic piece with a conductive bottom piece to define a cup-like part, roughening contacting surfaces of the assembled pieces, uniting the contacting surfaces by a sealing and insulating weld of high polymer resin of the epoxy type, thereafter inserting the electrochemical constituents of the power source into the cup-like part, then applying a metallic cover to the cup-like part and uniting the cover piece with the cup-like part by an electrically conductive sealing weld.

13. A sealed, gas-tight casing for an electrochemical power source of the button type containing electrodes of opposite polarity and electrolyte comprising a tubular conductive metallic part having a peripheral flange at each end thereof, a first metallic end cover plate in electrical connection with an electrode of one polarity, a second metallic end cover plate in electrical connection with another electrode of other polarity, an insulating sealing weld joining the first metallic cover plate to the peripheral flange of the tubular conductive metallic part at one end of the latter, and a second sealing weld joining the second metallic cover plate to the peripheral flange at the other end of said metallic tubular part.

14. A sealed, gas-tight casing for an electrochemical power source of the button type according to claim 13 wherein said insulating sealing weld is of glass having the same coefficient of expansion as the metal of the tubular conductive metallic part and of the metal cover plate it joins to the associated flange of said tubular conductive part and wherein said second sealing weld is electrically conductive.

15. A sealed, gas-tight casing for an electrochemical power source of the button type according to claim 13 wherein said insulating sealing weld is of polymerizable resin of the epoxy type having substantially the same coefficient of expansion as the metal of the tubular conductive metallic part and of the metal of the first metallic cover plate which is welded to the associated flange of said tubular metallic part by said resin.

16. A sealed, gas-tight casing for an electrochemical power source of the button type containing a positive electrode, a negative electrode and electrolyte therein comprising a tubular metallic part within which said electrodes and electrolyte lie, a metallic cover plate for one end of said tubular metallic part electrically connected to one of said electrodes, an insulating sealing weld joining said cover plate to said one end of said tubular metallic part, said sealing weld being of insulating material having the same coefficient of expansion as that of said tubular metallic part and of said cover plate, a second metallic cover plate electrically connected to the other of said electrodes and an electrically conductive sealing weld joining said second metallic cover plate to said tubular metallic part.

References Cited by the Examiner
UNITED STATES PATENTS

| | | | |
|---|---|---|---|
| 861,242 | 7/07 | Edison | 170—11 |
| 2,502,888 | 4/50 | Ravenscroft | 204—225 X |
| 2,626,970 | 1/53 | Hunrath. | |
| 2,775,534 | 12/56 | Herbert | 136—111 |
| 2,928,890 | 3/60 | Van Der Grinten et al. | 136—111 X |
| 2,934,580 | 4/60 | Neumann | 136—111 |

JOHN H. MACK, *Primary Examiner.*